US008848523B2

(12) United States Patent
Boyd et al.

(10) Patent No.: US 8,848,523 B2
(45) Date of Patent: Sep. 30, 2014

(54) METHOD FOR SUB-RATING AN ETHERNET PASSIVE OPTICAL NETWORK (EPON) MEDIUM ACCESS CONTROL (MAC) BASED COMMUNICATION LINK

(75) Inventors: Edward Wayne Boyd, Petaluma, CA (US); Sanjay Goswami, Santa Rosa, CA (US)

(73) Assignee: Broadcom Corporation, Irvine, CA (US)

( * ) Notice: Subject to any disclaimer, the term of this patent is extended or adjusted under 35 U.S.C. 154(b) by 552 days.

(21) Appl. No.: 13/163,283

(22) Filed: Jun. 17, 2011

(65) Prior Publication Data
US 2012/0257892 A1      Oct. 11, 2012

Related U.S. Application Data

(60) Provisional application No. 61/472,017, filed on Apr. 5, 2011.

(51) Int. Cl.
- *H04L 12/26* (2006.01)
- *H04L 12/815* (2013.01)
- *H04L 12/801* (2013.01)
- *H04Q 11/00* (2006.01)

(52) U.S. Cl.
CPC .............. *H04L 47/22* (2013.01); *H04L 47/13* (2013.01); *H04Q 2011/0064* (2013.01); *H04Q 11/0067* (2013.01)
USPC ............... 370/230; 370/229; 398/43; 398/58; 398/115

(58) Field of Classification Search
None
See application file for complete search history.

(56) References Cited

U.S. PATENT DOCUMENTS

| 7,180,910 B2 * | 2/2007 | Kim et al. ................. 370/468 |
| 8,644,143 B2 * | 2/2014 | Haran et al. .............. 370/230 |
| 2004/0136712 A1 * | 7/2004 | Stiscia et al. ............ 398/60 |
| 2009/0238575 A1 * | 9/2009 | Zhang et al. ............. 398/140 |
| 2012/0148245 A1 * | 6/2012 | Bowler et al. ............ 398/58 |

OTHER PUBLICATIONS

Gorsche et al., Introduction to IEEE 802.3av 10Gbit/s Ethernet Passive Optical Networks (10G EPON), Nov. 2009, China Communications, pp. 136-147.*
Shami et al., QoS Control Schemes for Two-Stage Ethernet Passive Optical Access Networks, Aug. 2005, IEEE Journal vol. 23, No. 8, pp. 1467-1478.*

* cited by examiner

*Primary Examiner* — Nicholas Sloms
(74) *Attorney, Agent, or Firm* — Sterne, Kessler, Goldstein & Fox P.L.L.C.

(57) ABSTRACT

Embodiments allow for EPON MAC traffic to be sub-rated according to available bandwidth and/or transmission capacity of the physical medium. EPON MAC traffic sub-rating is performed in the PHY layer. The PHY layer performing the sub-rating may be located anywhere in the communication path supporting the end-to-end EPON MAC link. Because the sub-rating is performed in the PHY layer, the EPON MAC layer at either end of the EPON MAC link is unaware of the sub-rating being performed, and thus continues to operate as it would normally according to the IEEE standard that it implements.

25 Claims, 9 Drawing Sheets

METHOD FOR SUB-RATING AN ETHERNET PASSIVE OPTICAL NETWORK (EPON) MEDIUM ACCESS CONTROL (MAC) BASED COMMUNICATION LINK

CROSS-REFERENCE TO RELATED APPLICATIONS

The present application claims the benefit of U.S. Provisional Application No. 61/472,017, filed Apr. 5, 2011, and the present application is related to U.S. patent application Ser. No. 12/878,643, filed Sep. 9, 2010, which claims the benefit of U.S. Provisional Patent Application No. 61/240,935, filed Sep. 9, 2009, and U.S. Provisional Patent Application No. 61/306,745, filed Feb. 22, 2010, all of which are incorporated herein by reference in their entireties.

BACKGROUND

1. Field of the Invention

The present invention relates generally to Ethernet Passive Optical Network (EPON) communications.

2. Background Art

A Passive Optical Network (PON) is a single, shared optical fiber that uses inexpensive optical splitters to divide a single fiber into separate strands feeding individual subscribers. An Ethernet PON (EPON) is a PON based on the Ethernet standard. EPONs provide simple, easy-to-manage connectivity to Ethernet-based, IP equipment, both at customer premises and at the central office. As with other Gigabit Ethernet media, EPONs are well-suited to carry packetized traffic.

Existing EPON Optical Line Terminals (OLTs) implement an EPON MAC layer. The EPON MAC layer provides various packet processing capabilities, quality of service (QoS) functions, and management features.

To ensure maximum leverage of EPON MAC features, it is desirable that the EPON MAC is used end-to-end from the OLT to the ONU. This means that standard defined EPON MAC data rates (1 Gbps or 10 Gbps) must be used between the OLT and the ONU. In practice, however, the physical medium between the OLT and the ONU (which may include a hybrid fiber coaxial network, for example) may not always sustain full EPON MAC data rates. There is a need, therefore, to sub-rate an EPON MAC communication link for upstream or downstream traffic.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

1. Hybrid EPON-EPOC Network Embodiments

Figure 1:
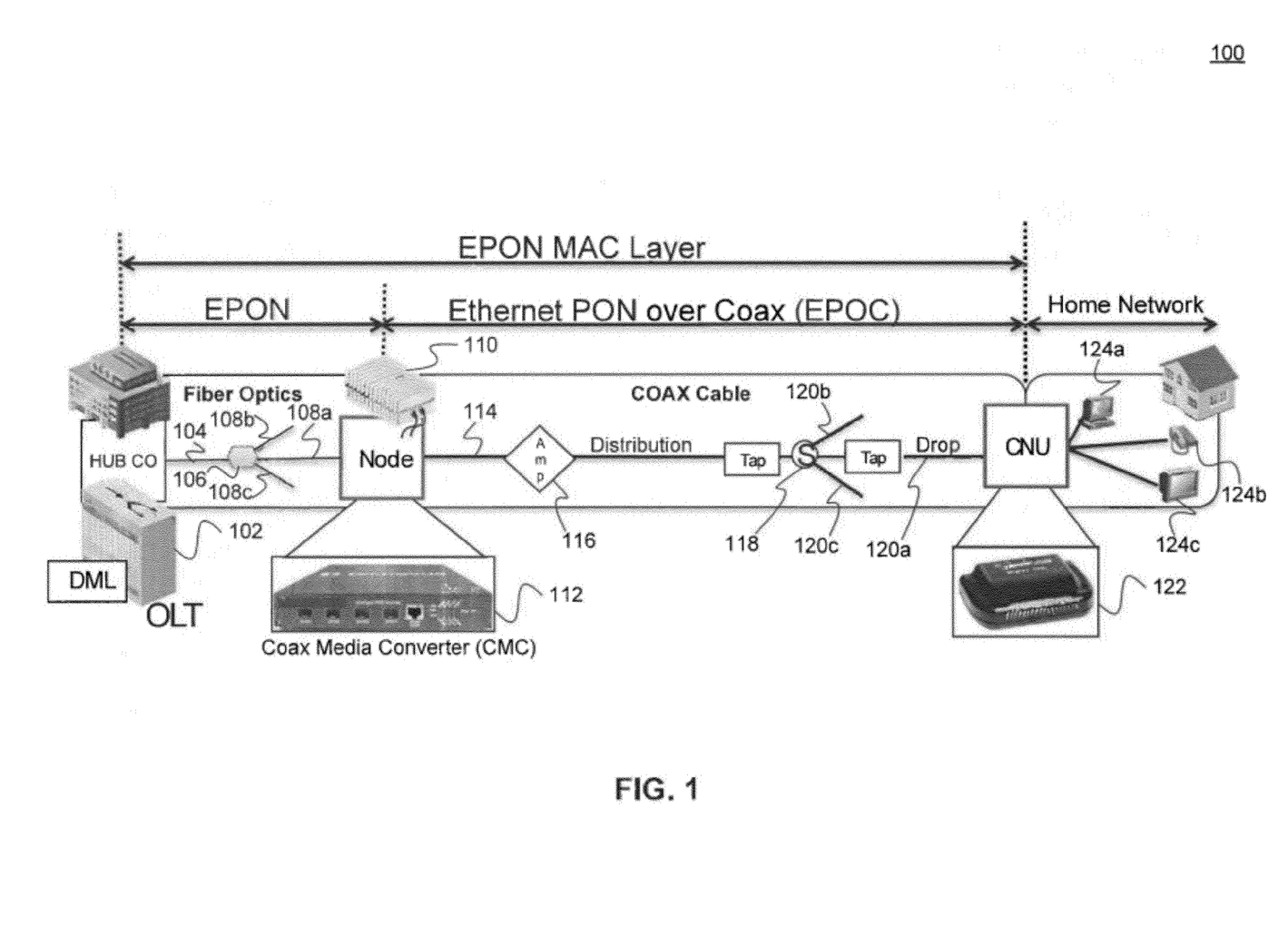
FIG. 1 illustrates an example hybrid Ethernet Passive Optical Network (EPON)-Ethernet Passive Optical Network Over Coax (EPOC) network architecture according to an embodiment of the present invention.

FIG. 1 illustrates an example hybrid Ethernet Passive Optical Network (EPON)-Ethernet Passive Optical Network Over Coax (EPOC) network architecture 100 according to an embodiment of the present invention. As shown in FIG. 1, example network architecture 100 includes an Optical Line Terminal (OLT) 102, an optional optical passive splitter 106, a communications node 110 including a coaxial media converter (CMC) 112, an optional amplifier 116, an optional coaxial splitter 118, a coaxial network unit (CNU) 122, and a plurality of subscriber media devices 124.

OLT 102 sits at a central office (CO) of the network and is coupled to a fiber optic line 104. OLT 102 may implement a DOCSIS (Data Over Cable Service Interface Specification) Mediation Layer (DML) which allows OLT 102 to provide DOCSIS provisioning and management of network components (e.g., CMC, CMU, Optical Network Unit (ONU)). Additionally, OLT 102 implements an EPON Media Access Control (MAC) layer (e.g., IEEE 802.3ah or IEEE 802.3av).

Optionally, passive splitter 106 can be used to split fiber optic line 104 into a plurality of fiber optic lines 108. This allows multiple subscribers in different geographical areas to be served by the same OLT 102 in a point-to-multipoint topology.

Communications node 110 serves as a bridge between the EPON side and the EPOC side of the network. Accordingly, node 110 is coupled from the EPON side of the network to a fiber optic line 108a, and from the EPOC side of the network to a coaxial cable 114. In an embodiment, communications node 110 includes a coaxial media converter (CMC) 112 that allows EPON to EPOC (and vice versa) bridging and conversion.

CMC 112 performs physical layer (PHY) conversion from EPON to EPOC, and vice versa. In an embodiment, CMC 112 includes a first interface (not shown in FIG. 1), coupled to fiber optic line 108, configured to receive a first optical signal from OLT 102 and generate a first bitstream having a first physical layer (PHY) encoding. In an embodiment, the first PHY encoding is EPON PHY encoding. CMC 112 also includes a PHY conversion module (not shown in FIG. 1), coupled to the first interface, configured to perform PHY layer conversion of the first bitstream to generate a second bitstream having a second PHY encoding. In an embodiment, the second PHY encoding is EPOC PHY encoding. Furthermore, CMC 112 includes a second interface (not shown in FIG. 1), coupled to the PHY conversion module and to coaxial cable 114, configured to generate a first radio frequency (RF) signal from the second bitstream and to transmit the first RF signal over coaxial cable 114.

In EPOC to EPON conversion (i.e., in upstream communication), the second interface of CMC 112 is configured to receive a second RF signal from CNU 122 and generate a third bitstream therefrom having the second PHY encoding (e.g., EPOC PHY encoding). The PHY conversion module of CMC 112 is configured to perform PHY layer conversion of the third bitstream to generate a fourth bitstream having the first PHY encoding (e.g., EPON PHY encoding). Subsequently, the first interface of CMC 112 is configured to generate a second optical signal from the fourth bitstream and to transmit the second optical signal to OLT 102 over fiber optic line 108.

Optionally, an amplifier 116 and a second splitter 118 can be placed in the path between communications node 110 and CNU 122. Amplifier 116 amplifies the RF signal over coaxial cable 114 before splitting by second splitter 118. Second splitter 118 splits coaxial cable 114 into a plurality of coaxial cables 120, to allow service over coaxial cables of several subscribers which can be within same or different geographic vicinities.

CNU 122 generally sits at the subscriber end of the network. In an embodiment, CNU 122 implements an EPON MAC layer, and thus terminates an end-to-end EPON MAC link with OLT 102. Accordingly, CMC 112 enables end-to-end provisioning, management, and Quality of Service (QoS) functions between OLT 102 and CNU 122. CNU 122 also provides GigE (Gigabit Ethernet) and 100M Ethernet ports to connect subscriber media devices 124 to the network. Additionally, CNU 122 enables gateway integration for various services, including VOIP (Voice-Over-IP), MoCA (Multimedia over Coax Alliance), HPNA (Home Phoneline Networking Alliance), Wi-Fi (Wi-Fi Alliance), etc. At the physical layer, CNU 122 may perform physical layer conversion from coaxial to another medium, while retaining the EPON MAC layer.

According to embodiments, EPON-EPOC conversion can occur anywhere in the path between OLT 102 and CNU 122 to provide various service configurations according to the services needed or infrastructure available to the network. For example, CMC 112, instead of being integrated within node 110, can be integrated within OLT 102, within amplifier 116, or in an Optical Network Unit (ONU) located between OLT 102 and CNU 122 (not shown in FIG. 1).

Figure 2:
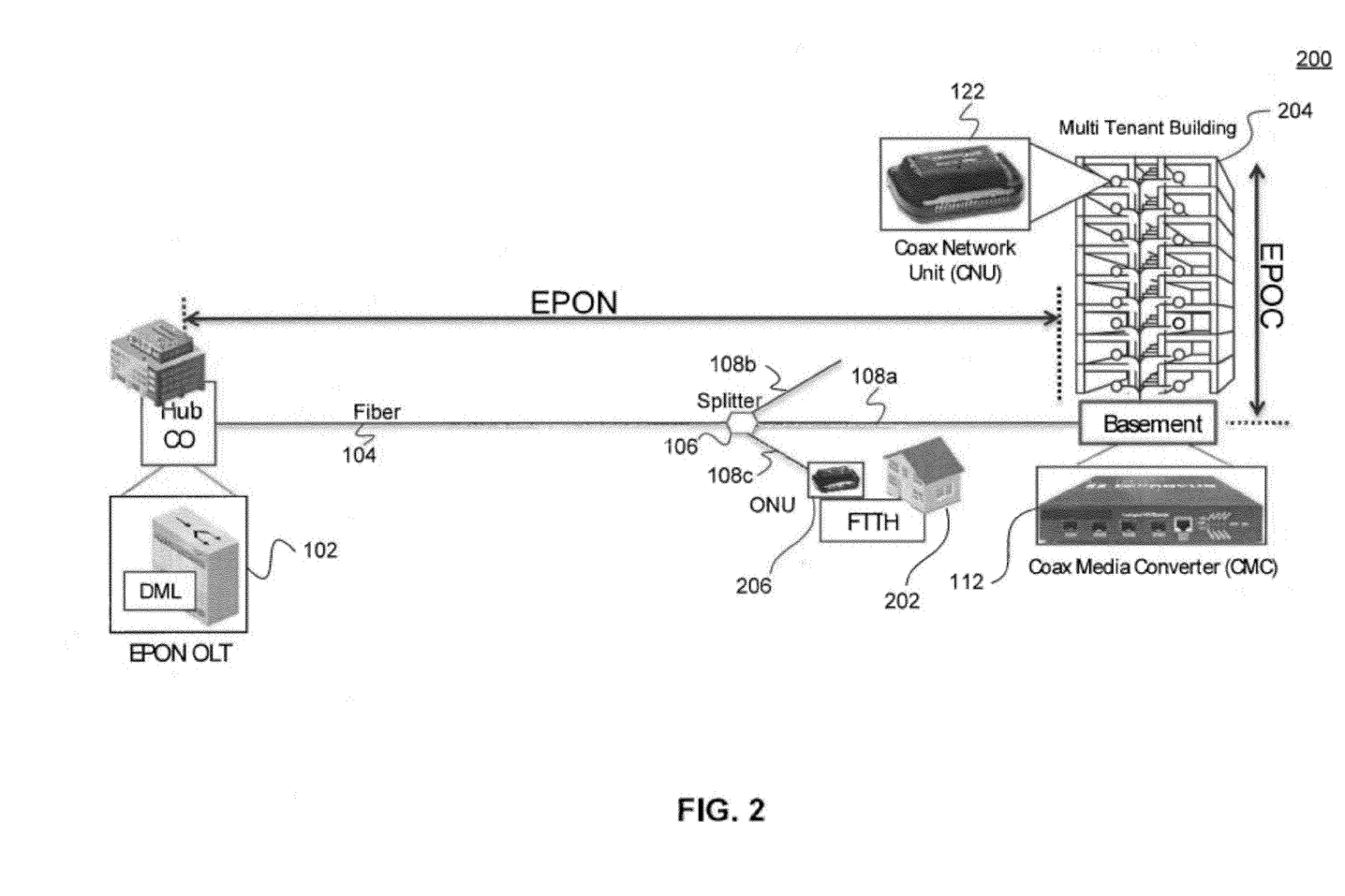
FIG. 2 illustrates another example hybrid EPON-EPOC network architecture for according to an embodiment of the present invention.

FIG. 2 illustrates another example hybrid EPON-EPOC network architecture 200 according to an embodiment of the present invention. In particular, example network architecture 200 enables simultaneous FTTH (Fiber to the Home) and multi-tenant building EPOC service configurations.

Example network architecture 200 includes similar components as described above with reference to example network architecture 100, including an OLT 102 located in a CO hub, a passive splitter 106, a CMC 112, and one or more CNUs 122. OLT 102, splitter 106, CMC 112, and CNU 122 operate in the same manner described above with reference to FIG. 1.

CMC 112 sits, for example, in the basement of a multi-tenant building 204. As such, the EPON side of the network extends as far as possible to the subscriber, with the EPOC side of the network only providing short coaxial connections between CMC 112 and CNU units 122 located in individual apartments of multi-tenant building 204.

Additionally, example network architecture 200 includes an Optical Network Unit (ONU) 206. ONU 206 is coupled to OLT 102 through an all-fiber link, comprised of fiber lines 104 and 108c. ONU 206 enables FTTH service to a home 202, allowing fiber optic line 108c to reach the boundary of the living space of home 202 (e.g., a box on the outside wall of home 202).

Accordingly, example network architecture 200 enables an operator to service both ONUs and CNUs using the same OLT. This includes end-to-end provisioning, management, and QoS with a single interface for both fiber and coaxial subscribers. In addition, example network architecture 200 allows for the elimination of the conventional two-tiered management architecture, which uses media cells at the end user side to manage the subscribers and an OLT to manage the media cells.

2. End-to-End EPON MAC Based Hybrid Fiber Coaxial (HFC) Network Embodiments

Figure 3:
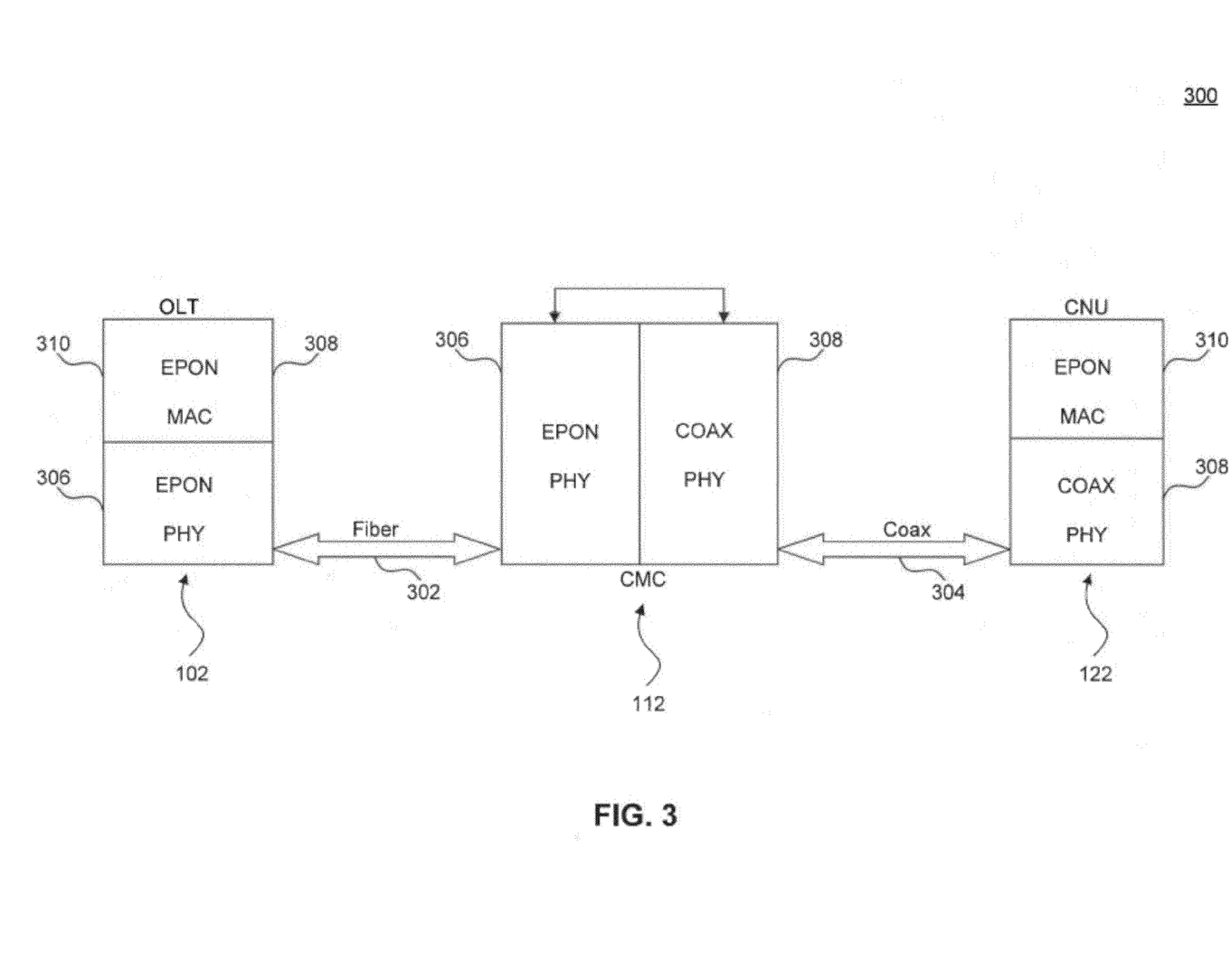
FIG. 3 illustrates an example end-to-end layered communication architecture between an Optical Line Terminal (OLT) and a Coaxial Network Unit (CNU) according to an embodiment of the present invention.

FIG. 3 illustrates an example end-to-end layered communication architecture 300 between an Optical Line Terminal (OLT) and a Coaxial Network Unit (CNU) according to an embodiment of the present invention. Example architecture 300 allows two-way EPON-EPOC communication between OLT 102 and CNU 122, via CMC 112.

As shown in FIG. 3, OLT 102 and CNU 122 are connected via a hybrid fiber coaxial (HFC) network. The HFC network includes a fiber optic line 302, a CMC 112, and a coaxial cable 304. As would be understood by a person of skill in the art, the HFC network of FIG. 3 is provided for the purpose of illustration only. In practice, the HFC network may include additional components, including amplifiers, splitters, etc. Fiber optic line 302 and coaxial cable 304 may each consist of one or more connected lines/cables with network components therebetween.

OLT 102 implements an EPON PHY layer 306 and an EPON MAC layer 310. CNU 122 implements a coaxial PHY layer 308 and an EPON MAC layer 310. CMC 112 sits between OLT 102 and CNU 122 and performs conversion at the PHY level only between OLT 102 and CNU 122, and vice versa. In particular, CMC 112 converts between EPON PHY and coaxial PHY, and vice versa.

By implementing the same EPON MAC layer 310 at both OLT 102 and CNU 122, example architecture 300 enables the EPON MAC to be used end-to-end (i.e., from OLT 102 to CNU 122), thereby leveraging the packet processing capabilities, QoS functions, and management features of the EPON MAC over a hybrid fiber coaxial (HFC) network.

Figure 4:
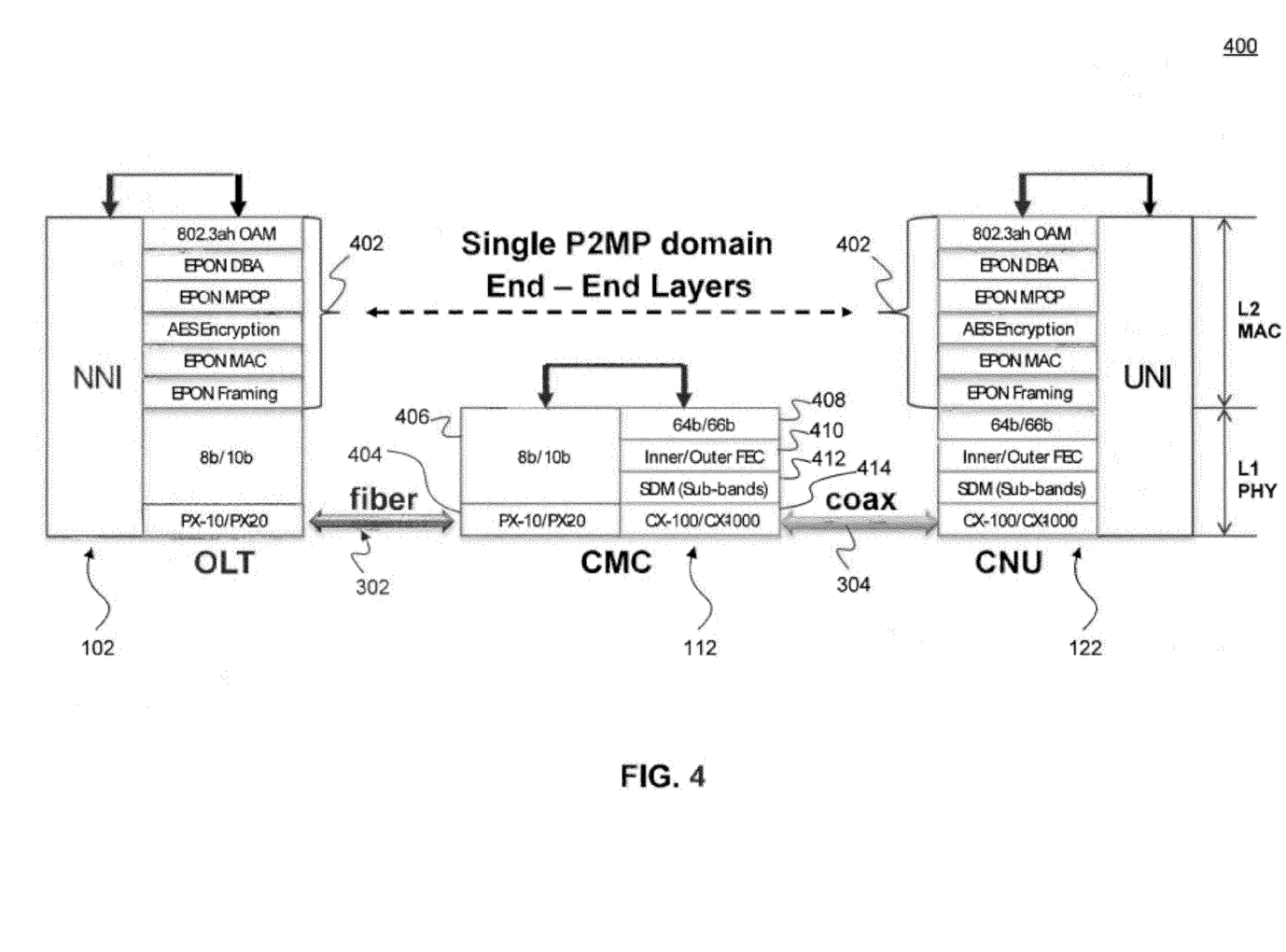
FIG. 4 illustrates another example end-to-end layered communication architecture between an Optical Line Terminal (OLT) and a Coaxial Network Unit (CNU) according to an embodiment of the present invention.

FIG. 4 illustrates another example end-to-end layered communication architecture 400 between an Optical Line Terminal (OLT) and a Coaxial Network Unit (CNU) according to an embodiment of the present invention.

Like example architecture 300, example architecture 400 allows two-way EPON-EPOC communication between OLT 102 and CNU 122, via CMC 112. Further, example architecture 400 enables the EPON MAC to be used end-to-end (i.e., from OLT 102 to CNU 122).

As shown in FIG. 4, OLT 102 and CNU 122 implement the same Layer 2 (L2) functions 402, including the EPON MAC layer. However, because OLT 102 and CNU 122 connect to different physical mediums (i.e., fiber versus coaxial), OLT 102 and CNU 122 implement different physical layers (PHY) (Layer 1).

CMC 112 sits between OLT 102 and CNU 122 and performs conversion at the PHY level only between the OLT 102 and CNU 122, and vice versa. In particular, CMC 112 converts a first bitstream having PHY encoding of OLT 102 (e.g., EPON PHY encoding) into a second bitstream with PHY encoding of CNU 122 (e.g., EPOC PHY encoding), and vice versa. Accordingly, the conversion at CMC 112 does not affect or change any framing in the received bitstream due to Layer 2 and above, including any framing due to the EPON MAC layer implemented at OLT 102 or CNU 122. In other words, data packets contained in the first bitstream and in the second bitstream have same MAC layer. In an embodiment, the MAC layer is of an EPON MAC layer (e.g., IEEE 802.3ah MAC layer).

In an embodiment, CMC 112 includes two physical layers (PHY) that implement first and second PHY stacks respectively, with the first PHY stack configured to communicate raw bits over a fiber optic line and the second PHY stack configured to communicate raw bits over a coaxial cable. Generally, the first PHY stack matches the PHY stack used by OLT 102, and the second PHY stack matches the PHY stack used by CNU 122. In an embodiment, the first PHY stack is configured as an EPON PHY stack and the second PHY stack is configured as a coaxial PHY stack. Additionally, CMC 112 includes a two-way conversion module that conditions an incoming bitstream received by the first PHY stack for transmission over the second PHY stack, and vice versa.

In an embodiment, as shown in FIG. 4, the first PHY stack includes two sublayers 404 and 406. Sublayer 404 performs power-related transmission functions over the fiber optic line, including determining and setting the transmission power levels. Sublayer 406 performs line encoding functions, including determining the line encoding rate of an incoming bitstream received by the first PHY from fiber optic line 302, stripping the line encoding of the incoming bitstream, and adding line encoding to an outgoing bitstream from the first PHY. In an embodiment, the first PHY uses 8 b/10 b line encoding.

The second PHY stack includes sublayers 408, 410, 412, and 414. Sublayer 408 performs line encoding and packet framing functions, including determining the line encoding rate of an incoming bitstream received by the second PHY from coaxial cable 304, stripping the line encoding of the incoming bitstream, and adding line encoding to an outgoing bitstream from the second PHY. In an embodiment, the second PHY uses 64 b/66 b line encoding. Additionally, sublayer 408 may perform framing functions, including adding framing bits to an outgoing bitstream from the second PHY and removing the framing bits of an incoming bitstream received by the second PHY. The framing bits determine the start and end of packets in a bitstream.

Sublayer 410 performs Forward Error Correction (FEC) functions, including adding inner and/or outer FEC bits to an outgoing bitstream from the second PHY, FEC correcting, and stripping the FEC bits of an incoming bitstream received by the second PHY.

Sublayer 412 performs Sub-Band Division Multiplexing functions, including determining the sub-bands to transmit an outgoing bitstream from the second PHY, dividing the outgoing bitstream into multiple sub-bands (as further described below with respect to FIG. 5), determining the width of the sub-bands, and assembling a bitstream received by the second PHY over multiple sub-bands to generate an incoming bitstream. According to embodiments, sublayer 412 may implement any one of Sub-Band Division Multiplexing (SDM), wavelet Orthogonal Frequency Division Multiplexing (OFDM), and Discrete Wavelet Multitone (DWMT), for example.

Sublayer 414 performs power-related transmission functions over coaxial cable. Sublayer 414 can be a proprietary sublayer or other sublayer adopted by a standards body.

The first PHY and the second PHY of CMC 112 form together with optionally other modules of CMC 112 (e.g., linking or interface modules between the first and second PHY) a two-way conversion module that conditions an incoming bitstream received by the first PHY for transmission by the second PHY, and vice versa. In an embodiment, an incoming bitstream received by the first PHY over a fiber optic line is processed by sublayers 404 and 406 of the first PHY stack to generate an intermediate bitstream. The intermediate bitstream then is processed consecutively by sublayers 408, 410, 412, and 414 of the second PHY stack to generate an outgoing bitstream for transmission by the second PHY over a coaxial cable. In a similar manner, an incoming bitstream received by the second PHY over the coaxial cable can be conditioned for transmission by the first PHY over the fiber optic line.

As would be understood by a person of skill in the art, example architectures 300 and 400, described above, are provided for the purpose of illustration only, and are not limiting of embodiments of the present invention. For example, in other embodiments, different Layer 1 (PHY) and Layer 2 (MAC) stacks and sublayers may be used to perform the media conversion functionality described above.

3. Embodiments for Sub-rating EPON MAC Traffic

Embodiments for enabling EPON MAC to be used end-to-end over HFC networks are described above. These embodiments allow for the packet processing capabilities, QoS functions, and management features of the EPON MAC layer to be leveraged over an HFC network.

IEEE standards define two data transmission rates for EPON MAC (upstream or downstream). They are 10 Gbps (10 G-EPON, IEEE 802.3av) and 1 Gbps (1 G-EPON, IEEE 802.3ah). Thus, to operate EPON MAC end-to-end, one of these two data rates must be used by the EPON MAC layers at the OLT and the CNU.

In practice, the HFC network may not be able to support the full EPON MAC data rates. For example, in some HFC networks, the EPOC portion of the network (e.g., the coaxial cable between the CMC and the CNU) may not have sufficient bandwidth (due to limited spectrum or noise impairments) to support the full EPON MAC data rates. In other cases, cost considerations necessitate that low cost transceivers that do not support the full EPON MAC data rates be used at the OLT, the CMC, or the CNU, for example. Accordingly, to continue to operate the EPON MAC end-to-end over the network (per standard specifications, without modifications to the EPON MAC itself), the EPON MAC traffic must be sub-rated according to available bandwidth and/or transmission capacity of the physical medium.

Embodiments, as further described below, allow for EPON MAC traffic to be sub-rated according to available bandwidth and/or transmission capacity of the physical medium. EPON MAC traffic sub-rating is performed in the PHY layer. The PHY layer performing the sub-rating may be located anywhere in the communication path supporting the end-to-end EPON MAC link, including in the CNU or the CMC, for example. Because the sub-rating is performed in the PHY layer, the EPON MAC layer at either end of the EPON MAC link is unaware of the sub-rating being performed, and thus continues to operate as it would normally according to the IEEE standard that it implements.

Embodiments will be described below with reference to an HFC network having similar architecture as described above in FIG. 3, for example. As would be understood by a person of skill in the art based on the teachings herein, embodiments are not limited to this example architecture. Further, embodiments are not limited for use in HFC networks. For example, embodiments may be used in any EPON MAC based network where EPON MAC traffic sub-rating is needed either in the upstream or the downstream. For example, embodiments may be used in a non-hybrid EPON network where limitations of network components at the OLT or the ONU necessitate that EPON MAC traffic be sub-rated (e.g., low cost 2/3 Gbps optical laser may be used instead of a 10 Gbps optical laser to run 10 G-EPON).

Figure 5:
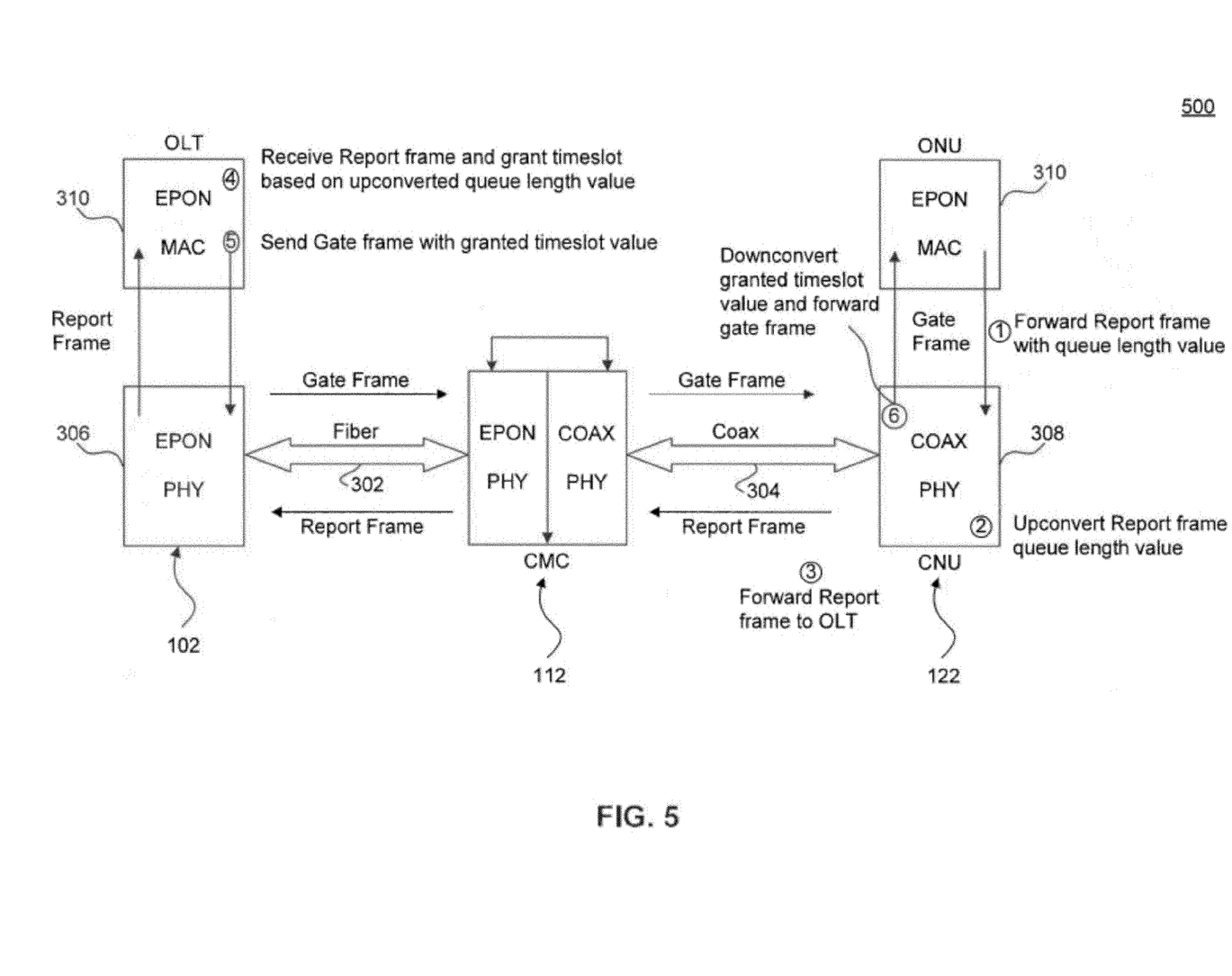
FIG. 5 illustrates an example process for sub-rating upstream EPON MAC traffic according to an embodiment of the present invention.

FIG. 5 illustrates an example process 500 for sub-rating upstream EPON MAC traffic according to an embodiment of the present invention. Example process 500 is described with reference to an example HFC network having similar architecture as described in FIG. 3 above. In particular, the example HFC network includes an OLT 102, a CMC 112, and a CNU 122. OLT 102 uses an EPON MAC layer 310 and an EPON PHY layer 306. CMC 112 converts between EPON PHY and coaxial PHY, and vice versa. CNU 122 uses a coaxial PHY layer 308 and an EPON MAC layer 310. Because CNU 122 implements an EPON MAC layer, the CNU appears to the OLT just like an ONU. Example process 500 may be performed by a processor contained in a PHY performing the sub-rating.

Typically, in an EPON, the OLT manages multiple ONUs. The EPON standard thus provides that the OLT specify the time slots during which ONUs transmit. In particular, the EPON standard provides a mechanism for allocating transmission time slots to ONUs. The mechanism includes a "Report" operation performed by ONUs and a "Gate" operation performed by the OLT. In a Report operation, an ONU (with packets to transmit) generates and sends a Report MPCPDU (Multipoint Control Protocol Data Unit) (Report frame) to the OLT. The Report frame includes an indication of a packet queue length at the ONU. In response to the Report frame, the OLT generates and sends a Gate MPCPDU (Gate frame) to the ONU. The Gate frame includes a time stamp, a transmission start time, and a transmission time slot. The OLT determines the transmission time slot based on a designated operating EPON MAC data rate (e.g., 1 Gbps or 10 Gbps) and the packet queue length indicated in the Report frame. Typically, the transmission time slot is provided in increments of 16 ns time quanta (16 ns is the time to transmit 2 bytes in 1 Gbps EPON).

Embodiments make use of the above described EPON standard allocation mechanism. In particular, as shown in FIG. 5, process 500 begins with EPON MAC layer 310 of CNU 122 generating and forwarding a Report frame to coaxial PHY layer 308 for transmission. The Report frame includes a packet queue length value representative of packet queue length at EPON MAC layer 310 and is destined to OLT 102. The Report frame is forwarded over a MAC-PHY interface.

Coaxial PHY layer 308 intercepts the Report frame from EPON MAC 310 before transmission onto coaxial cable 304, and up-converts (i.e., scales up) the packet queue length value in the Report frame based on an actual supported data rate over coaxial cable 304. In an embodiment, the packet queue length value is up-converted based on a ratio of the designated operating EPON MAC data rate and the actual supported data rate over cable 304 (up-conversion ratio). For example, if the designated operating EPON MAC data rate is 1 Gbps and the actual supported data rate is 333 Mbps, then the packet queue length value is multiplied by a factor of 3. As would be understood by a person of skill in the art based on the teachings herein, other ways to up-convert the packet queue length may also be used according to embodiments. In an embodiment, coaxial PHY layer 308 includes a MAC interface (not shown in FIG. 5) for communicating with EPON MAC 310, and an interceptor module (not shown in FIG. 5) that performs the interception of Report frames and the up-conversion of the packet queue length value before transmission onto coaxial cable 304.

In an embodiment, PHY layer 308 determines the actual supported data rate over coaxial cable 304 based on one more of the transmit/receive data rates of transceivers at either end of coaxial cable 304, available bandwidth of coaxial cable 304, modulation efficiency over cable 304, and measured transmission quality (e.g., SNR) of coaxial cable 304. As would be understood by a person of skill in the art based on the teachings herein, other parameters or measurements may also be used to determine the actual supported data rate over coaxial cable 304. In an embodiment, coaxial PHY layer 308 includes a data rate determination module (not shown in FIG. 5) that determines the actual supported data rate over coaxial cable 304 as described above.

After up-converting the packet queue length value in the Report frame, coaxial PHY layer 308 transmits the Report frame to OLT 102. The Report frame is forwarded to OLT 102 by CMC 112. At OLT 102, the Report frame is received by EPON PHY 306 and then forwarded to EPON MAC 310.

EPON MAC 310 receives the Report frame and processes it as it would normally according to the EPON standard. Specifically, EPON MAC 310 determines a transmission start time and a transmission time slot based on the Report frame, and generates a time-stamped Gate frame with the determined start time and transmission time slot. The transmission time slot is granted based on the designated operating EPON MAC data rate (e.g., 1 Gbps or 10 Gbps) and the up-converted packet queue length value in the Report frame. EPON MAC 310 also accounts for a RTT (round trip time) between OLT 102 and CNU 122 when it determines the start time. The RTT is measured using Gate and Report operations according to the EPON standard.

EPON MAC 310 then sends the Gate frame to CNU 122 (i.e., the ONU originating the Report frame). The Gate frame is transmitted by EPON PHY 306 to coaxial PHY 308 via CMC 112.

At CNU 122, coaxial PHY 308 intercepts the Gate frame before it is forwarded to EPON MAC 310, down-converts the transmission time slot value indicated in the Gate frame, and then forwards the Gate frame to EPON MAC 310. In an embodiment, coaxial PHY 308 down-converts the transmission time slot value by a ratio (down-conversion ratio) inversely proportional to the up-conversion ratio used to up-convert the packet queue length value of the Report frame. In other words, a product of the up-conversion ratio and the down-conversion ratio is equal to one (1). In an embodiment, these steps are performed by the same (or a different) interceptor module that performs the up-conversion of the packet queue length.

By the process described above, the transmission time slot allocated for CNU 122 to transmit its packets is sufficiently long for all packets to reach OLT 102 before any other scheduled ONU in the network begins transmission to the OLT 102 over the same physical medium. The EPON MAC layers 310 at either end of the link operate under the same conditions as if the physical medium supported full EPON MAC data rates. In other words, EPON MAC layers 310 transmit only at full EPON MAC data rates and do not down-rate their traffic in any way. In fact, at CNU 122, EPON MAC 310 is unaware that a transmission time slot based on an up-converted queue packet length value has been granted by OLT 102, and thus transmits at a full EPON MAC data rate assuming a smaller transmission time slot value is available to it.

When EPON MAC layer 310 of CNU 122 receives the Gate frame from coaxial PHY layer 308, it processes the Gate frame as it would normally according to the EPON standard. In particular, EPON MAC layer 310 updates a time stamp register based on the time stamp contained in the Gate frame, updates a slot start register based on the start time contained in the Gate frame, and updates a slot length register based on the down-converted transmission time slot value contained in the Gate frame. Subsequently, EPON MAC layer 310 waits for the allocated start time to begin packet transmission.

When the allocated start time is reached, EPON MAC layer 310 begins packet transmission at the designated operating EPON MAC data rate (e.g., 1 Gbps or 10 Gbps).

Figure 6:
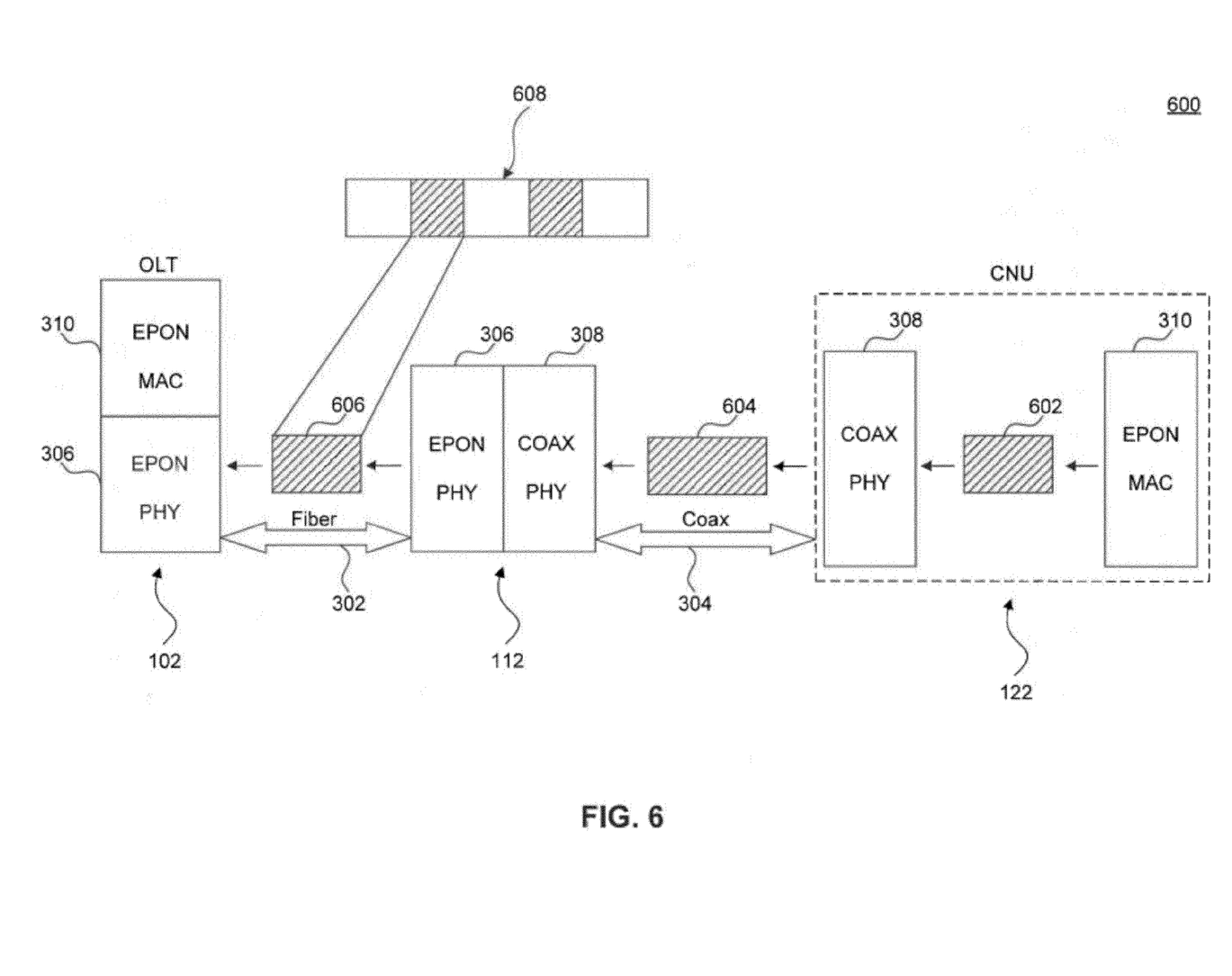
FIG. 6 illustrates an example flow of upstream EPON MAC traffic according to an embodiment of the present invention.

FIG. 6 illustrates an example flow 600 of upstream EPON MAC traffic according to an embodiment of the present invention. Example flow 600 takes place after the process described in FIG. 5 has been performed, and is described with reference to the same HFC network described above in FIGS. 3 and 5.

Example flow 600 illustrates a same segment of EPON MAC traffic being transmitted from EPON MAC 310 layer of CNU 122 to EPON MAC layer 310 of OLT 102. The EPON MAC traffic segment may be a single EPON MAC packet or a packet stream with multiple EPON MAC packets.

Between EPON MAC layer 310 and coaxial PHY layer 308 of CNU 122, the EPON MAC traffic segment, represented in the time domain as segment 602 in FIG. 6, is transmitted at the designated operating EPON MAC data rate (e.g., 1 Gbps or 10 Gbps). As described above, EPON MAC layer 310 operates under the assumption that the time slot allocated by OLT 102 is equal to the down-converted transmission time slot value contained in the Gate frame.

Between coaxial PHY layer 308 of CNU 122 and coaxial PHY layer 308 of CMC 112, the EPON MAC traffic segment, represented in the time domain as segment 604 in FIG. 6, is transmitted at the actual supported data rate of coaxial cable 304. As described above, the actual supported data rate of coaxial cable 304 may be lower than the designated operating EPON MAC data rate. However, because coaxial PHY layer 308 has previously up-converted the packet queue length value in the Report frame sent to OLT 102, coaxial PHY layer 308 is given more time to transmit the EPON MAC traffic segment over coaxial cable 304 to CMC 112.

CMC 112 receives the EPON MAC traffic segment over coaxial cable 304 at the actual supported data rate of coaxial cable 304. However, CMC 112 must re-transmit the EPON MAC traffic segment over fiber optic line 302 at the designated operating EPON MAC data rate. Because the actual supported data rate of coaxial cable 304 is lower than the designated operating EPON MAC data rate, CMC 112 cannot immediately re-transmit the received EPON MAC traffic segment. Accordingly, in an embodiment, CMC 112 buffers the received EPON MAC traffic segment, and after a pre-determined delay begins to transmit the EPON MAC traffic segment over fiber optic line 302 at the designated EPON MAC data rate. According to embodiments, buffering can be performed in coaxial PHY layer 308 or in EPON PHY layer 306 of CMC 112.

Transmission of the EPON MAC traffic segment over fiber optic line 302 is represented in the time domain as segment 606 in FIG. 6. As described above, the transmission is done at the designated operating EPON MAC data rate. The overall traffic pattern over fiber optic line 302 is illustrated by example segment 608 in FIG. 6. As shown, the overall traffic pattern exhibits idle periods followed by utilization periods due to the buffering at CMC 112. Typically, the percentage of utilization of fiber optic line 302 is approximately equal to the down-conversion ratio, used to down-convert the allocated transmission time slot value at coaxial PHY 308 of CNU 122.

As would be understood by a person of skill in the art based on the teachings herein, one or more steps of the above described embodiments can be performed at different entities along the end-to-end EPON MAC link between EPON MAC layer 310 of CNU 122 and EPON MAC layer 310 of OLT 102. For example, in the above described embodiments, the sub-rating process (i.e., up-conversion of queue packet length value, down-conversion of transmission time slot value, etc.) has been described as performed in coaxial PHY layer 308 of CNU 122. However, embodiments are not limited as such. For example, one or more steps of the sub-rating process may be performed (in addition, or alternatively, to coaxial PHY layer 308 of CNU 122) at coaxial PHY 308 of CMC 112, at EPON PHY 306 of CMC 112, or both.

Also, as would be understood by a person of skill in the art based on the teachings herein, the above described embodiments may be implemented in an adaptive fashion so as to accommodate changes in conditions (e.g., transmission quality, noise, etc.). For example, in an embodiment, the actual supported data rate of coaxial cable 304 is determined periodically and the sub-rating process is adjusted accordingly.

In other scenarios, the HFC network architecture is such that CMC 112 connects to a plurality of CNUs 122 via respective coaxial cables 304, and to OLT 102 via fiber optic line 302. Accordingly, embodiments, as described above, are implemented in the coaxial PHY layer 308 of each individual CNU 122. Embodiments implemented in different CNUs operate independently, each based on the respective coaxial cable 304 that connects the CNU to CMC 112. Thus, different CNUs may transmit at different upstream data rates to CMC 112.

Figure 7:
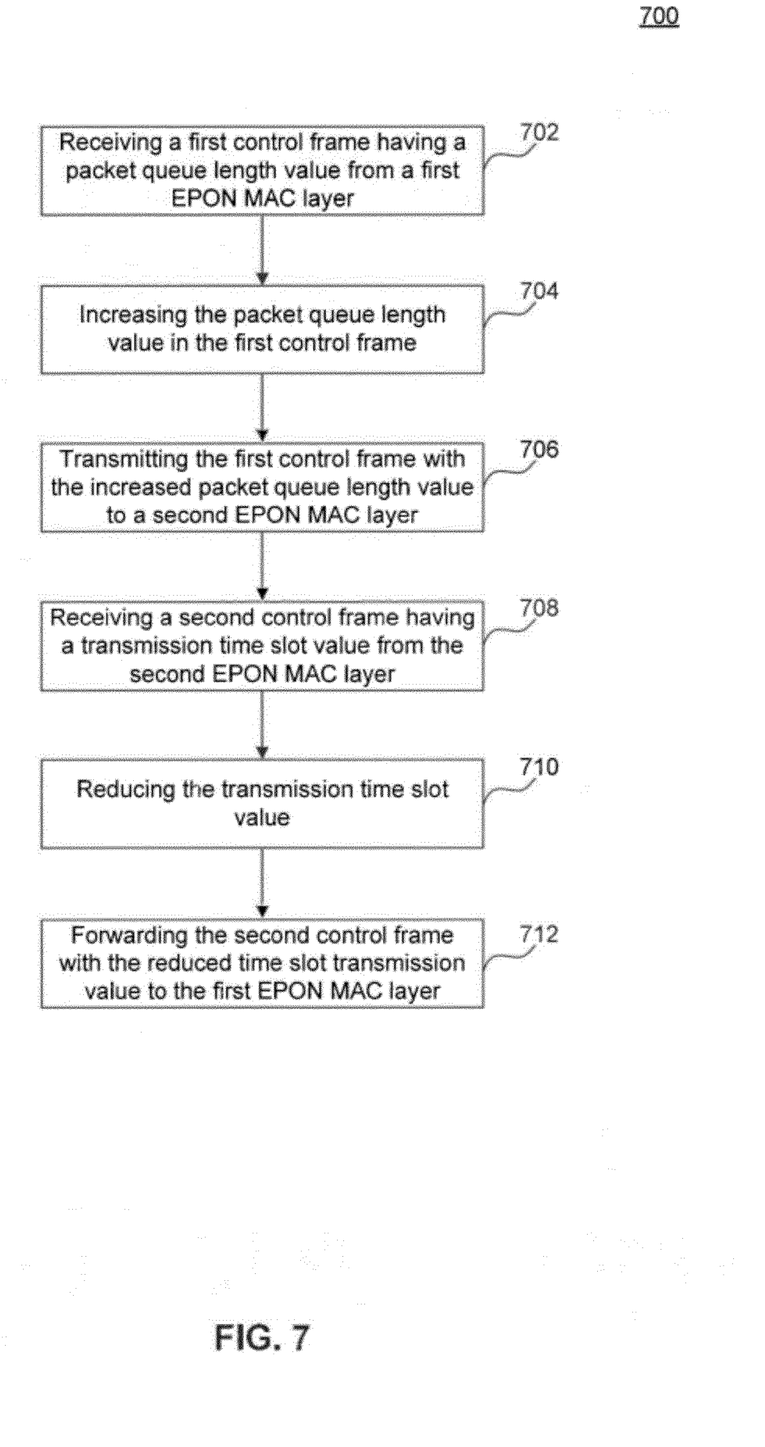
FIG. 7 is a process flowchart of a method for sub-rating upstream EPON MAC traffic according to an embodiment of the present invention.

FIG. 7 is a process flowchart 700 of a method for sub-rating EPON MAC traffic according to an embodiment of the present invention. Process 700 may be performed by a PHY layer. The PHY layer may be a coaxial PHY layer as described in the exemplary embodiments above, or a PHY layer of another medium type (e.g., optical PHY layer, such as EPON PHY). The PHY layer may be a PHY that connects an ONU to an EPON or to a hybrid EPON/EPOC (i.e., HFC) network. Alternatively, the PHY layer may be located in a CMC that sits between an ONU and an OLT in a hybrid EPON/EPOC network. Process 700 may also be performed by more than one PHY layers, situated at different locations in the network.

Process 700 begins in step 702, which includes receiving a first control frame having a packet queue length value from a first EPON MAC layer. In an embodiment, the first control frame is a Report MPCPDU (Report frame). The first EPON MAC layer may be the MAC layer of an ONU.

Step 704 includes increasing the packet queue length value in the first control frame. In an embodiment, step 704 includes up-converting the packet queue length value based on an actual supported data rate over the physical medium attached to the PHY layer. In an embodiment, the packet queue length value is up-converted based on a ratio of a designated operating EPON MAC data rate and the actual supported data rate over the physical medium (up-conversion ratio).

Subsequently, step 706 includes transmitting the first control frame with the increased packet queue length value to a second EPON MAC layer. In an embodiment, the second EPON MAC layer is located in an OLT which manages the ONU.

Step 708 includes receiving a second control frame having a transmission time slot value from the second EPON MAC layer. In an embodiment, the second control frame is a Gate MPCPDU (Gate frame).

Step 710 includes reducing the transmission time slot value contained in the second control frame. In an embodiment, step 710 includes down-converting the transmission time slot value by a ratio (down-conversion ratio) inversely proportional to the up-conversion ratio used to up-convert the packet queue length value of the first control frame in step 704.

Finally, step 712 includes forwarding the second control frame with the reduced time slot transmission value to the first EPON MAC layer. Subsequently, the first EPON MAC layer begins data transmission based on the reduced time slot transmission value, but at the normal EPON data rate (1 Gbps or 10 Gbps).

As described above, the IEEE standard defined EPON MAC data rates are 1 Gbps and 10 Gbps for both upstream and downstream communication. Thus, in the case that the EPOC portion of the HFC network (e.g., coaxial cable 304) cannot sustain the designated operating EPON MAC data rate, downstream EPON MAC traffic (like upstream EPON MAC traffic) must be sub-rated. According to embodiments, downstream EPON MAC traffic sub-rating is performed according to available bandwidth and/or transmission capacity of the physical medium. In an embodiment, downstream EPON MAC traffic sub-rating is performed in the PHY layer. The PHY layer performing the sub-rating may be located anywhere in the communication path supporting the end-to-end EPON MAC link. In an embodiment, downstream EPON MAC traffic sub-rating is performed in the OLT (either in the EPON MAC or the EPON PHY layer of the OLT), the CMC, or both. In some embodiments, however, EPON MAC traffic sub-rating at the OLT is not available. As such, sub-rating is only performed further downstream, such as at the CMC, for example. Because the sub-rating is performed in the PHY layer, the EPON MAC layer at either end of the EPON MAC link is unaware of the sub-rating being performed, and thus continues to operate as it would normally according to the IEEE standard that it implements (e.g., IEEE 802.3ah or IEEE 802.3av).

Figure 8:
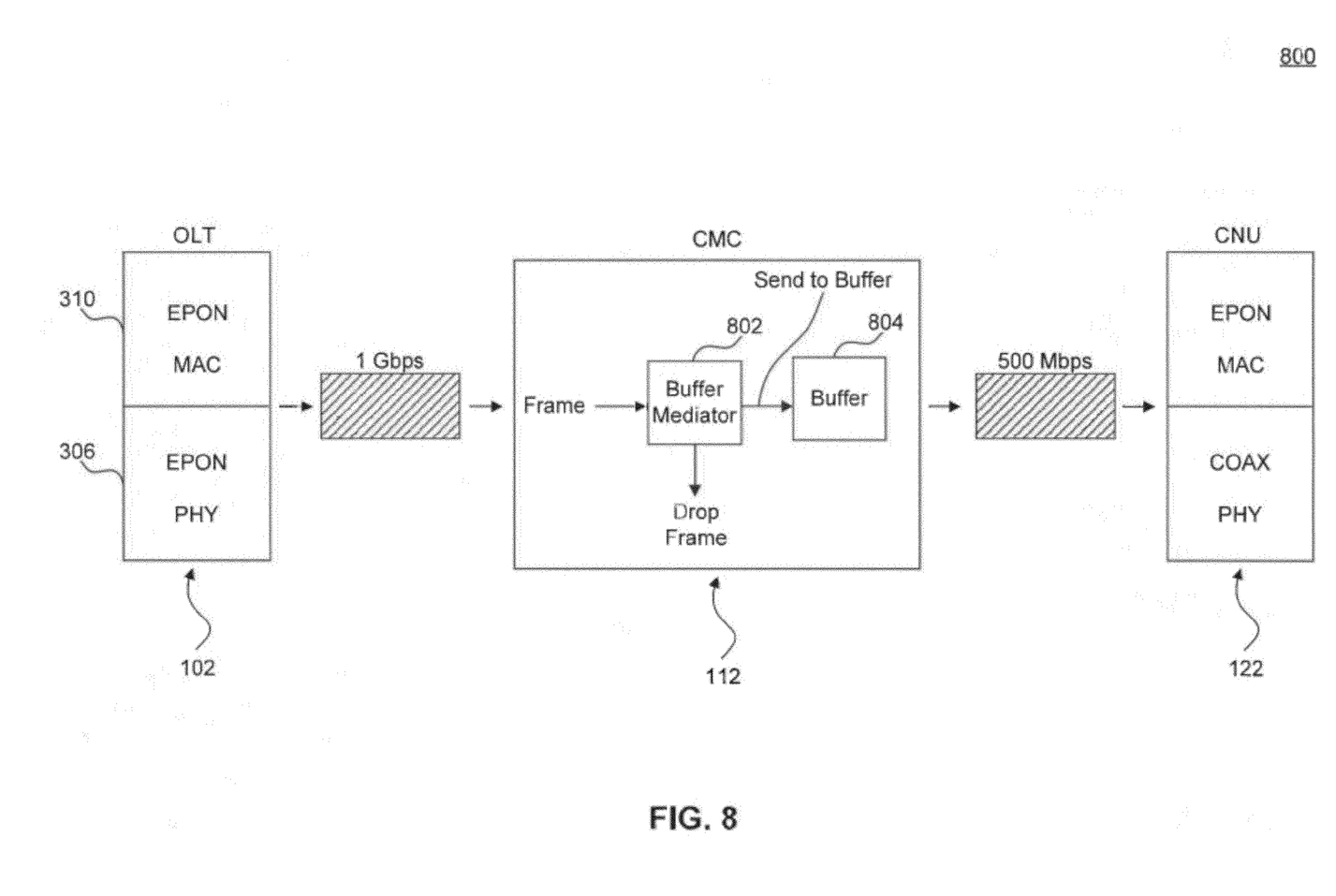
FIG. 8 illustrates an example process for sub-rating downstream EPON MAC traffic according to an embodiment of the present invention.

FIG. 8 illustrates an example process 800 for sub-rating downstream EPON MAC traffic according to an embodiment of the present invention. Example process 800 illustrates a scenario where downstream EPON MAC traffic sub-rating is performed at the CMC only. Example process 800 may be used where sub-rating at the OLT is not available. As shown in FIG. 8, process 800 begins with OLT 102 transmitting downstream traffic over fiber optic line 302 at the designated operating EPON MAC data rate (e.g., 1 Gbps).

CMC 112 receives the transmitted downstream traffic from OLT 102 at the designated operating EPON MAC data rate (e.g., 1 Gbps). However, CMC 112 may not transmit over coaxial cable 304 at more than the actual supported data rate of coaxial cable 304 (e.g., 500 Mbps in example process 800). As such, when the actual supported data rate of coaxial cable 304 is lower than the designated operating EPON MAC data rate, a portion of the downstream EPON MAC traffic must be dropped at CMC 112.

In an embodiment, as shown in FIG. 8, CMC 112 implements a buffer mediator module 802 and a frame buffer 804. Frames received by CMC 112 are processed by buffer mediator 802, which determines whether a frame is dropped or sent to buffer 804 for further transmission onto coaxial cable 304. As would be understood by a person of skill in the art, this process may also be performed on a packet-by-packet level.

In certain conditions, the sub-rating of EPON MAC traffic at CMC 112 may result in out-of-order packets at CNU 122. To remedy this problem, time stamps are inserted into transmitted packets at CMC 112 and extracted by CNU 122, to re-order received packets as needed.

Figure 9:
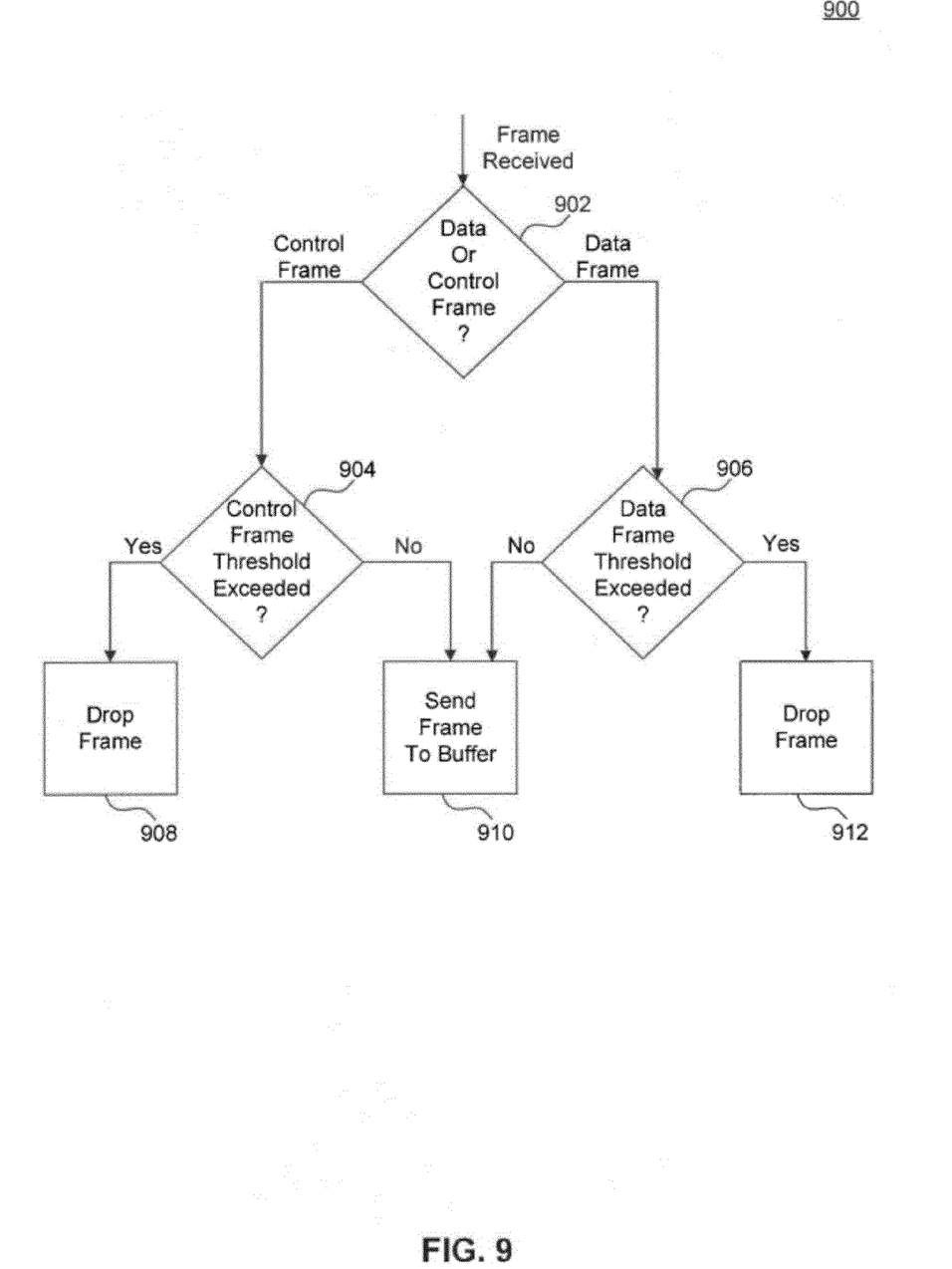
FIG. 9 is a process flowchart of a method for sub-rating downstream EPON MAC traffic according to an embodiment of the present invention.

FIG. 9 is a process flowchart 900 of a method for sub-rating downstream EPON MAC traffic according to an embodiment of the present invention. Process 900 may be performed by buffer mediator module 802, for example.

Process 900 begins in step 902, which includes determining whether a received frame is a data frame (user data) or a control frame (MPCP frame).

If the received frame is a control frame, process 900 proceeds to step 904, which includes determining whether a control frame threshold has been exceeded. In an embodiment, the control frame threshold is exceeded when a first pre-defined level of the buffer has been reached (i.e., the buffer is filled up to or above the first pre-defined level). If the control frame threshold has been exceeded, the control frame is dropped in step 908. Otherwise, the control frame is sent to the frame buffer in step 910.

In a similar fashion, if the received frame is a data frame, process 900 proceeds to step 906, which includes determining whether a data frame threshold has been exceeded. In an embodiment, the data frame threshold is exceeded when a second pre-defined level of the buffer has been reached (i.e., the buffer is filled up to or above the second pre-defined level). If the data frame threshold has been exceeded, the data frame is dropped in step 912. Otherwise, the data frame is sent to the frame buffer in step 910.

Typically, control frames are received at a lower data rate than data frames and are generally of higher importance than data frames. Accordingly, in an embodiment, to ensure that control frames are dropped less frequently than data frames, the first pre-defined level of the buffer (which determines whether the control frame threshold is exceeded) is configured to be higher than the second pre-defined level of the buffer (which determines whether the data frame threshold is exceeded).

As would be understood by a person of skill in the art based on the teachings herein, process 900 may also be modified to accommodate OAM (Operations, Administration, and Maintenance) frames, in addition to control and data frames. Alternatively, OAM frames may be treated as control frames in process 900.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for sub-rating Ethernet Passive Optical Network (EPON) Medium Access Control (MAC) traffic over a communication link, comprising:
   receiving, by a physical layer (PHY) device, a first control frame having a packet queue length value from a first EPON MAC layer module;
   increasing the packet queue length value in the first control frame;
   transmitting the first control frame with the increased packet queue length value to a second EPON MAC layer module;
   receiving a second control frame having a transmission time slot value from the second EPON MAC layer module;
   reducing the transmission time slot value; and
   forwarding the second control frame with the reduced time slot transmission value to the first EPON MAC layer module.

2. The method of claim 1, wherein the first control frame is a Report Multipoint Control Protocol Data Unit (MPCPDU) as defined by IEEE 802.3ah or IEEE 802.3av.

3. The method of claim 1, wherein the second control frame is a Gate Multipoint Control Protocol Data Unit (MPCPDU) as defined by IEEE 802.3ah or IEEE 802.3av.

4. The method of claim 1, wherein the first EPON MAC layer module is located in an optical network unit (ONU).

5. The method of claim 1, wherein the second EPON MAC layer nodule is located in an optical e terminal (OLT).

6. The method of claim 1, wherein said increasing step comprises up-converting the packet queue length value based on at least one of: an actual supported data rate of the communication link and a designated operating EPON MAC data rate.

7. The method of claim 6, wherein the designated operating EPON MAC data rate is one of 10 Gbps for 10 G-EPON and 1 Gbps for 1 G-EPON.

8. The method of claim 6, wherein the transmission time slot value is determined based on the increased packet queue length value.

9. The method of claim 8, wherein said reducing step comprises down-converting the transmission time slot value based on at least one of: the actual supported data rate of the communication link and the designated operating EPON MAC data rate.

10. The method of claim 8, wherein said reducing step comprises down-converting the transmission time slot value in an inversely proportional manner to said up-converting of the packet queue length value.

11. The method of claim 6, further comprising:
    receiving packets from the first EPON MAC layer module at the designated operating EPON MAC rate; and
    transmitting the packets over the communication link at the actual supported data rate of the communication link.

12. The method of claim 1, wherein the first and second EPON MAC layer modules implement 10 G-EPON MAC layers as defined by IEEE 802.3av or 1 G-EPON MAC layers as defined by IEEE 802.3ah.

13. The method of claim 1, wherein the communication link includes a coaxial cable.

14. The method of claim 1, wherein the communication link includes a fiber optical line.

15. The method of claim 1, wherein the communication link includes a hybrid fiber coaxial (HFC) network.

16. The method of claim 1, wherein the method is performed in a PHY implemented by the PHY device.

17. The method of claim 1, wherein the PHY device connects an optical network unit (ONU) to the communication link.

18. The method of claim 1, wherein the PHY device is located in a coaxial media converter (CMC), situated between an optical network unit (ONU) and an optical line terminal (OLT).

19. The method of claim 16, wherein the PHY is an EPON PHY or a coaxial PHY.

20. A physical layer (PHY) chip, comprising:
    a medium access control (MAC) interface configured to communicate with a first Ethernet Passive Optical Network (EPON) MAC layer module;
    an interceptor module configured to intercept a first control frame originating from the first EPON MAC layer module and to increase a packet queue length value in the first control frame; and
    a transceiver module configured to transmit the first control frame to a second EPON MAC layer module;
    wherein the transceiver module is further configured to receive a second control frame from the second EPON MAC layer module, and wherein the interceptor module is further configured to intercept the second control frame and to decrease a transmission time slot value in the second control frame.

21. A computer program product comprising a non-transitory computer readable medium having computer program logic recorded thereon, the computer logic when executed by a processor enabling a method for sub-rating of Ethernet Passive Optical Network (EPON) Medium Access control (MAC) traffic over a communication link, the method comprising:
    receiving a first control frame having a packet queue length value from a first EPON MAC layer module;
    increasing the packet queue length value in the first control frame;
    transmitting the first control frame with the increased packet queue length value to a second EPON MAC layer module;
    receiving a second control frame having a transmission time slot value from the second EPON MAC layer module;
    reducing the transmission time slot value; and
    forwarding the second control frame with the reduced time slot transmission value to the first EPON MAC layer module.

22. The computer program product of claim 21, wherein the first EPON MAC layer module is located in an optical network unit (ONU), and the second EPON MAC layer module is located in an optical line terminal (OLT).

23. The computer program product of claim 21, wherein said increasing step comprises up-converting the packet queue length value based on at least one of: an actual supported data rate of the communication link and a designated operating EPON MAC data rate.

24. A method for sub-rating Ethernet Passive Optical Network (EPON) Medium Access Control (MAC) traffic over a communication link, comprising:
    receiving, by a physical layer (PHY) device, a first control frame having a packet queue length value from a first EPON MAC layer module;
    increasing the packet queue length value in the first control frame, wherein increasing the packet queue length value comprises up-converting the packet queue length value based on an actual supported data rate of the communication link and a designated operating EPON MAC data rate; and transmitting the first control frame with the increased packet queue length value to a second EPON MAC layer module.

25. The method of claim 24, wherein the communication link comprises a coaxial link coupled to a fiber link, and wherein the actual supported data rate of the communication link corresponds to a data rate of the coaxial link.

* * * * *

UNITED STATES PATENT AND TRADEMARK OFFICE
CERTIFICATE OF CORRECTION

| | | |
|---|---|---|
| PATENT NO. | : 8,848,523 B2 | Page 1 of 1 |
| APPLICATION NO. | : 13/163283 | |
| DATED | : September 30, 2014 | |
| INVENTOR(S) | : Boyd et al. | |

It is certified that error appears in the above-identified patent and that said Letters Patent is hereby corrected as shown below:

In the Claims

Column 13, line 34, please replace "optical e terminal" with --optical line terminal--.

Column 13, line 41, please replace "10 G-EPON" with --10G-EPON--.

Column 13, line 42, please replace "1 G-EPON" with --1G-EPON--.

Column 13, line 61, please replace "10 G-EPON" with --10G-EPON--.

Column 13, line 62, please replace "1 G-EPON" with --1G-EPON--.

Column 14, line 34, please replace "control" with --Control--.

Signed and Sealed this
Twenty-fourth Day of March, 2015

Michelle K. Lee
*Director of the United States Patent and Trademark Office*